United States Patent [19]
Someya et al.

[11] Patent Number: 5,772,119
[45] Date of Patent: Jun. 30, 1998

[54] SHOWER HEAD HAVING A MECHANISM FOR TREATING HOT WATER

[75] Inventors: Shinichi Someya; Takashi Toyama; Nobuhiko Taneichi, all of Tokyo, Japan

[73] Assignee: Marine Bio Co., Ltd., Tokyo, Japan

[21] Appl. No.: 547,405

[22] Filed: Oct. 24, 1995

[30] Foreign Application Priority Data

Oct. 28, 1994 [JP] Japan .................................. 6-287124

[51] Int. Cl.⁶ ...................................................... B05B 7/26
[52] U.S. Cl. ......................... 239/315; 239/316; 239/460; 239/553.3; 239/590.3; 4/615
[58] Field of Search ................................ 239/590, 590.3, 239/462, 553, 553.3, 315, 316; 4/596, 597, 615; 210/282, 283, 449

[56] References Cited

U.S. PATENT DOCUMENTS

| | | | |
|---|---|---|---|
| 1,650,460 | 11/1927 | Morgan et al. | 239/315 |
| 1,658,830 | 2/1928 | Bingham | 239/315 |
| 1,945,701 | 2/1934 | Pearl | 239/316 |
| 1,973,319 | 9/1934 | Nelson | 239/315 |
| 2,199,478 | 5/1940 | Bruzard | 239/316 |
| 2,537,790 | 1/1951 | Sage | 239/315 |
| 2,690,930 | 10/1954 | Corson | 239/316 |
| 2,773,601 | 12/1956 | Keller et al. | 210/449 |
| 2,975,980 | 3/1961 | Siebert et al. | 239/316 |
| 2,986,340 | 5/1961 | Webb | 239/315 |
| 3,018,969 | 1/1962 | Gentry | 239/316 |
| 3,780,869 | 12/1973 | Krongos | 210/240 |
| 3,801,018 | 4/1974 | Plotz | 239/316 |
| 4,107,046 | 8/1978 | Corder | 210/282 |
| 4,172,796 | 10/1979 | Corder | 210/238 X |
| 4,211,368 | 7/1980 | Legros et al. | 239/315 |
| 4,242,201 | 12/1980 | Stephes et al. | 4/615 |
| 4,460,650 | 7/1984 | Ogawa et al. | 428/389 |
| 4,504,389 | 3/1985 | Rundzaitis | 210/266 X |
| 4,772,455 | 9/1988 | Izumi et al. | 423/210 |
| 4,776,956 | 10/1988 | Gannaway | 210/282 |
| 4,933,080 | 6/1990 | Rundzaitis et al. | 4/615 |
| 5,008,011 | 4/1991 | Underwood | 4/615 |
| 5,152,464 | 10/1992 | Farley | 239/553.3 |
| 5,213,688 | 5/1993 | Robinson | 4/615 |
| 5,269,921 | 12/1993 | Ruger et al. | 210/282 |
| 5,324,434 | 6/1994 | Oikawa et al. | 210/87 |
| 5,385,667 | 1/1995 | Steger | 4/615 |
| 5,549,822 | 8/1996 | Ferguson | 239/553 |

FOREIGN PATENT DOCUMENTS

SHO61-227887 10/1986 Japan .

Primary Examiner—Andres Kashnikow
Assistant Examiner—Lisa Ann Douglas
Attorney, Agent, or Firm—Burns, Doane, Swecker & Mathis LLP

[57] ABSTRACT

A shower head comprises a hot-water treating mechanism accommodated in a water passage formed in a shower head case of the shower head. The hot-water treating mechanism has coral sand and active carbon fiber, and has calcium sulfite if necessary. These materials are arranged serially along a water-flow direction in the shower head. For example, these materials are arranged concentrically, through which hot water is made to flow from the center to the periphery. In order to realize this concentrical arrangement of these materials, these materials are made to be a sheet structure, and are overlaid and wound to form a sheet roll. Acrylic active carbon fiber can be used as the active carbon fiber. The shower head can effectively remove chlorine from a large flow rate of hot water having a temperature of about 40 degrees of centigrade. Further, it is possible to reduce in weight of the shower head having a hot-water treating mechanism below 300 grams.

17 Claims, 4 Drawing Sheets 5,772,119

SHOWER HEAD HAVING A MECHANISM FOR TREATING HOT WATER

BACKGROUND OF THE INVENTION

1. Field of the Invention

The present invention relates to a shower head for using hot water. More specifically, the present invention pertains to a shower head having a hot-water treating mechanisms which removes sterilizing chloride rendering the hot water supplied to the shower head.

2. Prior Art Description

Sterilizing chlorine contained in showering water may damage hair, and it is preferred to remove active chlorine from the showering water.

Conventionally, there have been known water purifying devices for removing chlorine contained in water, which are filled with hollow fiber film, active carbon or the like and are widely utilized for removing chlorine from drinking tap water. For example, Japanese Patent Laid-Open No. SHO 61-227887 discloses a water purifying device having calcium carbonate and active carbon. Treatment of removing chlorine from drinking water tap water is carried out in a condition that the temperature of water to be treated is as low as about 20 degrees centigrade and that an amount of water to be treated is as small as one to two liters per minute, and therefore chlorine can be removed from water satisfactorily using conventional water purifying devices.

However, since hot water of about 40 degrees centigrade is usually used for showering water and an amount of water to be consumed becomes as large as about 8 to 12 liters per minute. Hence, the conventional water purifying devices designed for purifying drinking tap water are not suitable for use in purification of showering water. In other words, the conventional water purifying devices must be increased in size in order to improve their treatment capacity and to reduce pressure loss of water flowing therethrough. If the water purifying device becomes large in size, however, it cannot be placed in the shower head or the like. Instead, it must be installed on a floor, for example, of a bath room. However, the bath room is high in both temperature and moisture and, in addition, a large amount of aging waste matters such as soap, human skin and the like are generated; thus, the installed devices tend to become unsanitary.

Accordingly, it is preferable that the water purifying mechanism for shower water is accommodated in the shower head assembly. As long as the hand-held shower head is concerned, this type of shower head is preferably constituted so that the weight thereof is less than about 300 grams in a condition that hot water is injected from the shower face of the shower head.

In the case of the water purifying mechanism disclosed in the above-mentioned Japanese Patent Laid-Open Publication which has calcium carbonate and active carbon, it is necessary to provide an active-carbon layer which is sufficiently thick, otherwise it cannot be expected to purify a large flow rate of showering water. Where an amount of active carbon to be used is increased, the weight of the hand-held shower head increases accordingly, which is not preferable. In addition, granular active carbon which is typically used for water purifying devices for drinking water is not capable of removing chlorine from hot water of about 40 degrees of centigrade.

Whereas, a hot-water shower head provided with a chlorine removing mechanism is commercially available, which is provided with a redox filter of calcium sulfite placed in a water passage of the shower head. In this type of water purifying device, since a large amount of calcium sulfite is used, calcium sulfate is generated after hot water passes and is stored in the water passage loss of the shower head, to thereby increase water pressure in the shower head, whereby chlorine removing effect is degraded.

SUMMARY OF THE INVENTION

An object of the present invention is to provide a shower head having a hot-water treating mechanism which is capable of removing chlorine from a large flow rate of hot water in an effective manner.

The other object of the present invention is to provide a small and light shower head having a hot-water treating mechanism.

An another object of the present invention is to provide a shower head having a hot-water treating mechanism which is capable of making mineral shower water and of neutralizing acid-side shower water.

A further object of the present invention is to provide a shower head having a hot-water treating mechanism, which is able to remove iron rust materials, organic substances, odor, heavy metal substances, foreign particles and the like as well as chlorine.

In order to achieve the above and other objects, according to the present invention, there is provided a shower head having a hot-water treating mechanism wherein the hot-water treating mechanism is placed in a water passage in the shower head, and wherein the hot-water treating mechanism is provided with coral sand and active carbon fiber.

It is preferred that the coral sand and the active carbon fiber are arranged serially along a direction in which water passes through the shower head.

In a preferred embodiment, the hot-water treating mechanism comprises a core layer and an outer layer arranged concentrically around the core layer, wherein the core layer is made from either one of the coral sand or the active carbon fiber and the outer layer is from the other of the two.

Instead, the hot-water treating mechanism may comprise a first sheet having the coral sand and a second sheet made of active carbon fiber, wherein the first and second sheets are overlaid and wound to form a sheet roll.

As to the active carbon fibers, acrylic ones are preferable.

In another aspect of the present invention, the hot-water treating mechanism is provided with calcium sulfite as well as the coral sand and the active carbon fiber. These materials are arranged serially along a direction in which water passes through the shower head.

The hot-water treating mechanism is constituted such that it has a core layer, a middle layer formed concentrically around the core layer and an outer layer formed concentrically around the middle layer, wherein the respective layers are formed with one of the above three materials, respectively and exclusively.

Alternatively, the above three materials may be in the form of a sheet structure and overlaid with one another to be wound to form a sheet roll.

Further, in the case of hot-water treating mechanism having calcium sulfite, it is also preferable to use acrylic active carbon fibers.

The above and other objects and advantages of the present invention will be apparent from reading the following description with reference to attached drawings.

DETAILED DESCRIPTION OF PREFERRED EMBODIMENTS

Figure 1:
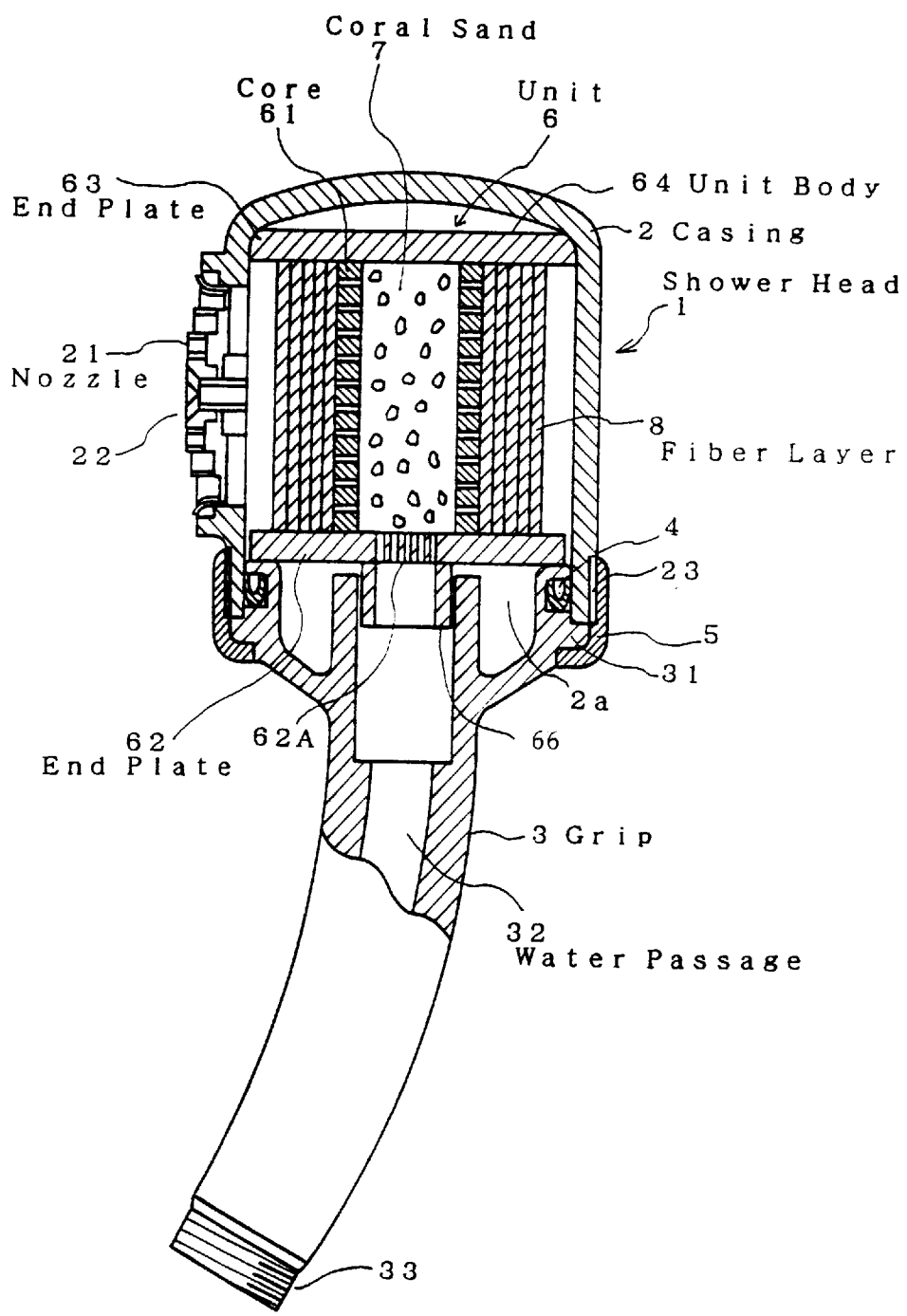
FIG. 1 is a schematic sectional view showing the inner structure of a shower head of an example according to the present invention.

Referring now to the drawings, examples of the present invention will be described.

Figure 2A:
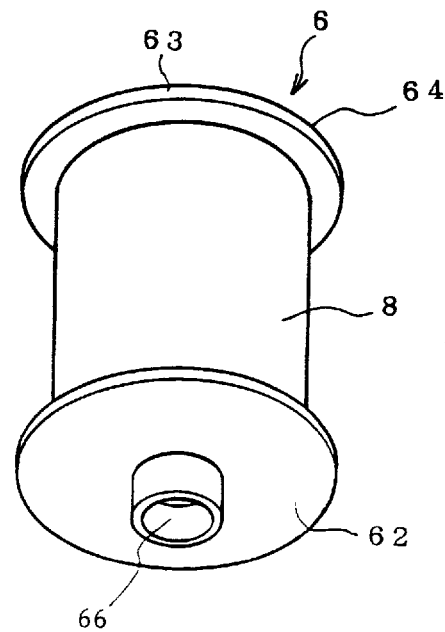
FIGS. 2(A) and 2(B) are a perspective view and a partially cut-out perspective view of a treatment unit accommodated in the shower head of FIG. 1, respectively.
Figure 2B:
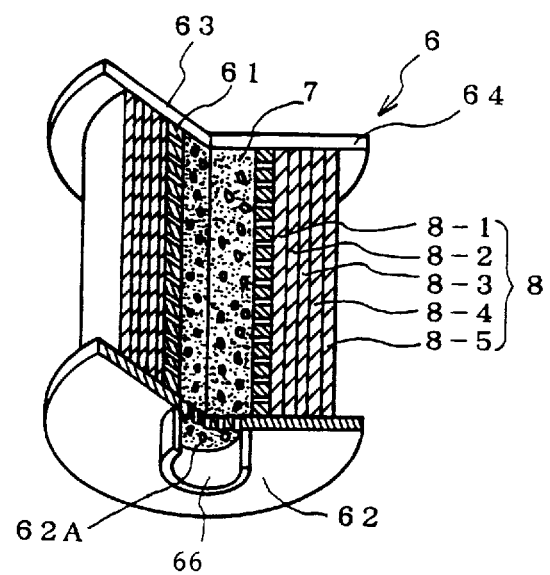
Figure 3A:
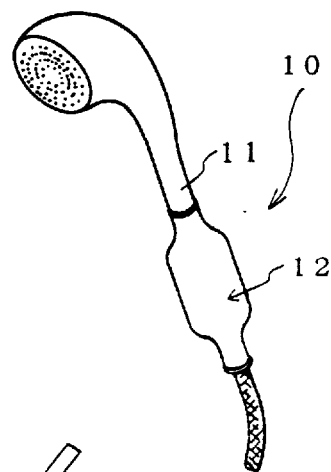
FIG. 3 is an another example of the shower head according to the present invention.
Figure 3B:
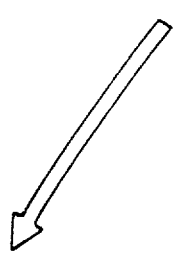
Figure 3B:
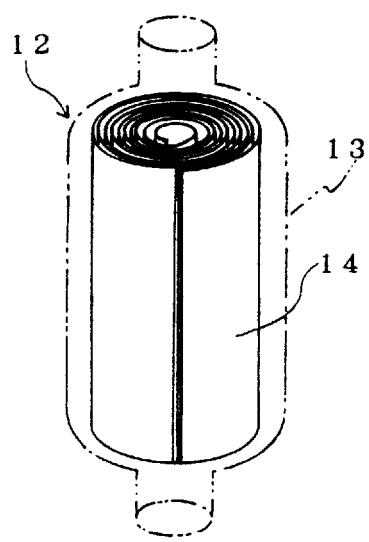
Figure 3C:
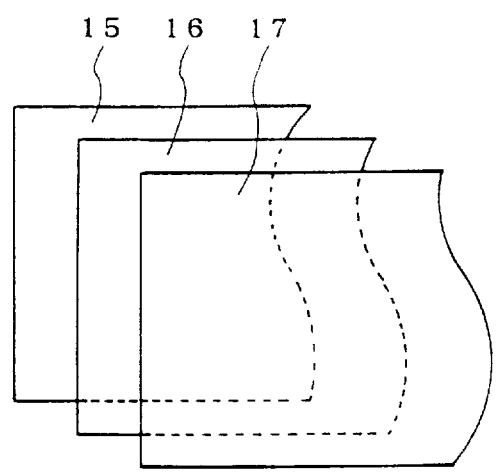

FIG. 1 is a schematic sectional view of a shower head according to the present invention, and FIG. 2 shows a hot-water treating unit accommodated in the shower head of FIG. 1.

The hand-held shower head 1 has a tubular body casing 2 having an opening at its one end 2a and a shower-head grip attached to the open end 2a of the body casing 2. The body casing 2 is provided at its outer circumferential surface with a shower face 22 having a plurality of nozzles 21.

The body casing 2 has exterior-thread portion 23 formed on its outer circumferential surface at the side of the opening end 2a, to which a connection end 31 of a large diameter formed on the shower-head grip 3 is connected via a seal ring 4. A connected ring 5 having interior-thread portion 51 on its inner circumferential surface is mounted around the openings 2a of the main-body casing and the connecting end 31 of the shower-head grip in a condition that the connecting ring 5 is screwed around the opening end 2a of the main-body casing.

The shower head 2 is formed therein with a water passage 32 through which hot water passes. An opposite end of the grip 3 is connected via a flexible hosepipe (not shown) to a hot-water supply such as a boiler (not shown).

On the other hand, in the inner side of the main-body casing 2, there is accommodated a column-shaped hot-water treatment unit 6. The hot-water treatment unit 6 has a unit body 64 comprising a tubular core 61 and circular end plates 62, 63 provided on both ends of the core 61. The core 61 is made of porous material. The outer diameter of each of the end plates 62, 63 is adjusted to fix into the inner circumferential surface of the main-body casing 2. The end plate 62 positioned at the side of shower-head grip 3 is formed on its center with a hot-water inducting portion 62A. The end plate 62 is also formed with a connecting pipe 66 surrounding the hot-water inducting portion 62A and projecting from the end plate. The connecting pipe 66 is fixedly inserted into the connecting inner-side pipe 34 formed on the connecting end 31 of the shower-head grip 3.

The core 61 of the thus constituted unit body 64 has an inner space into which coral sand 7 is filled. Around the core 61, there are formed concentrically a plurality of fiber layers 8 made of active carbon fiber. In this example, five-layered fiber layers 8 (8-1, 8-2, 8-3, 8-4, 8-5) are provided. The pore diameter of the core 61 is set so as not to pass coral sand particles therethrough.

The coral sand or sandy coral fossils are crushed fossilized skeletons of hermatypic coral in a tropical or subtropical sea area, and have a great number of pores. Accordingly, the coral sand occurring in nature as it is, or the coral sand which is heat-treated after a certain degree of salt content is removed by washing the coral sand can absorb fine particles floating in water and materials dissolving in water and can remove them from tap water. Particularly, if the coral sand is heat-treated, the size of the pores increases from about 10 $\mu$m to 50 $\mu$m. Furthermore, the coral fossils or coral sand have a bacteriostatic effect themselves.

Note that the coral sand or coral fossils have the following ratio of constituents, and the main constituent is calcium carbonate (about 96%). The granules originating in skeletons of marine organisms such as oyster shells have approximately the same composition.

| Constituents of coral sand and sandy coral fossils | |
|---|---|
| carbonic acid ($CO_2$) | 40.8% |
| calcium | 35.0% |
| magnesium | 2.0% |
| aluminum | 0.03% |
| strontium | 0.38% |
| potassium | 10 ppm |
| sodium | 1200 ppm |
| iron | 1220 ppm |
| phosphorus | 360 ppm |
| silicon ($SiO_2$) | 2100 ppm |
| fluorine | 270 ppm |
| chlorine | 190 ppm |
| sulfur | 2100 ppm |
| iodine | 2.2 ppm |
| copper | 0.8 ppm |
| zinc | 2.4 ppm |
| nickel | 1.8 ppm |
| chromium | 14 ppm |
| cobalt | 12 ppm |
| manganese | 2 ppm |
| vanadium | 1 ppm |
| boron | 10 ppm |
| bromine | 2 ppm |
| titanium | 430 ppm |
| selenium | 0.05 ppm |
| molybdenum | less than 0.2 ppm |
| lead | 0.6 ppm |
| arsenic ($As_2O_3$) | 2.0 ppm |
| cadmium | not detected |
| mercury | not detected |
| ignition loss | 3.0% |
| loss on drying | 0.18% |

Consequently, the coral sand filled into the core 61 removes chlorine from hot water running through the shower head by the reaction expressed by the formulas below, and at the same time calcium content eluted from the coral sand makes the hot water weak alkaline.

$$H_2O + Cl_2 \rightarrow CHl + HClO \qquad (1)$$

$$HClO \rightarrow HCl + O\uparrow \qquad (2)$$

$$CaCO_2 + 2HCl \rightarrow CaCl_2 + CO_2\uparrow + H_2O \qquad (3)$$

Accordingly, if hair is washed with hot water passing through the shower head of the present example, the hair will not be damaged or discolored by chlorine.

Furthermore, the coral sand or coral fossils, unlike mineral resources or industrial goods, have ecological chemical composition, and contain magnesium, sodium potassium, phosphorus and so on, important living organism constituents, which are eluted to make water mineral water. As a result, it becomes possible to wash hair with mineral water.

Next, the active-carbon-fiber layers 8 has a bulk density of 0.05 to 0.2 g/cc and a thickness of about 15 to 20 mm. Since granular active carbon conventionally used for water purifying devices has a bulk density of about 0.2 to 0.3 g/cc, the weight thereof becomes about four times that of the active-carbon-fiber layers 8 if the granular active carbon is used to make a layer having the same thickness as that of the layers 8. Thus, the granular active carbon layer is too heavy to be accommodated in a hand-held shower head. In this case, since the particle diameter of the granular active carbon must be made larger, the chlorine removing capacity of the granular active carbon becomes degraded. This defect can be avoided by the present example.

The active carbon fiber used for the present example is acrylic active carbon fiber which is induced from acrylic fiber as a raw material. The acrylic active carbon fiber is superior in terms of chlorine removing capacity. In particular, since the acrylic active carbon fiber having a surface area of about 800 to 1200 $m^2/g$ has nitrogen originating in nitrile group, it exhibits a high chlorine removing capacity which is maintained even when hot water is passed at a high flow speed through the shower head in which the acrylic active carbon fibers are provided.

In operation of the shower head 1 of the present example, hot water which is supplied to the shower head 1 running through a boiler and a hosepipe, runs through the water passage 32 formed in the grip 3 reaches the treatment unit 6 positioned in the main body 2 of the shower head. The hot water then flows through the hot water inducting portion 62A into the coral sand 7 which is filled inside the core 61. After passing through the coral sand 7, the hot water passes through the outer wall of the core 61 and active carbon fiber layers 8 placed around the core 61 to flow out into an annular gap formed between the outer circumferential surface of the treatment unit 6 and an inner circumferential surface of the main body 2. After passing through the annular gap, the hot water is injected outside from the nozzles 21.

When the hot water passes through the coral sand 7, carbonate which is a main ingredient of the coral sand is eluted in the hot water, so that the hot water is shifted to a basic side. At the same time, with a filtering effect by the coral sand itself, the hot water is removed therefrom foreign matters, chlorine and the like. The hot water is removed chlorine completely therefrom by passing through the active carbon fiber layers 8.

Since the active carbon fiber layers 8 are made of active carbon fibers, they have a bulk density lower than that of the granular active carbon and therefore are able to increase in layer thickness thereof. This means that, compared to the case in which the granular active carbon is used, it is possible to contact the hot water to the active carbon for a longer period of time, so that removing of chlorine from a large flow rate of hot water can be assured.

According to the present example, it is possible to realize a hand-held shower head having a mechanism for treating hot water, the weight of which is below 300 grams. Further, since the active carbon fiber layers are formed to be a cylindrical shape and are arranged around the coral sand, it is possible to make hot-water passing area large and to reduce the pressure loss of the hot water passing through the layers as it flows toward the outer periphery side. Therefore, it is possible to pass hot water at a high rate of flow through the active carbon fiber layers.

Next, FIG. 3 illustrates a hand-held shower head according to an another example of the present invention. The shower head 10 as shown in FIG. 3 is constituted so that a shower grip 11 is connected serially with a treatment unit 12. The treatment unit 12 is designed at its the other end side to connect with a hosepipe through which hot water is supplied. The treatment unit 12 has a cylindrical unit case 13 in which a column-shaped sheet roll 14 is disposed. In the present example, the sheet roll 14 comprises a first sheet 15 having coral sand, a second sheet 16 formed from active carbon fiber, and a third sheet 17 having calcium sulfite, these three sheets being wound up to form the sheet roll 14. The hand-held shower head 10 can also produce similar effects as those of the above-mentioned shower head 1.

As the first sheet 15 having coral sand, such a structure can be adopted that two nonwoven sheets having a water permeability are overlaid with each other so as to form sealed portions arranged along the longitudinal direction of the sheets at an equal interval and a prescribed amount of coral sand is filled in each of the sealed portions. Similarly, the third sheet 17 having calcium sulfite can also be constituted.

Figure 4A:
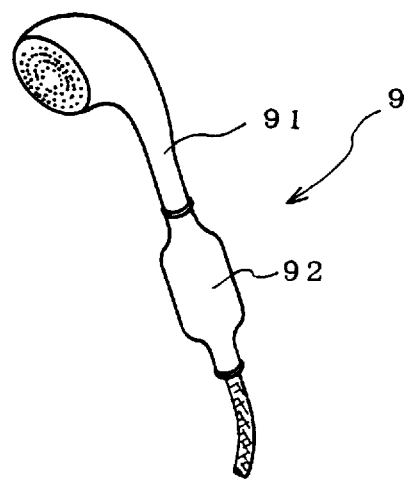
FIG. 4 is a still another example of the shower head according to the present invention.
Figure 4B:
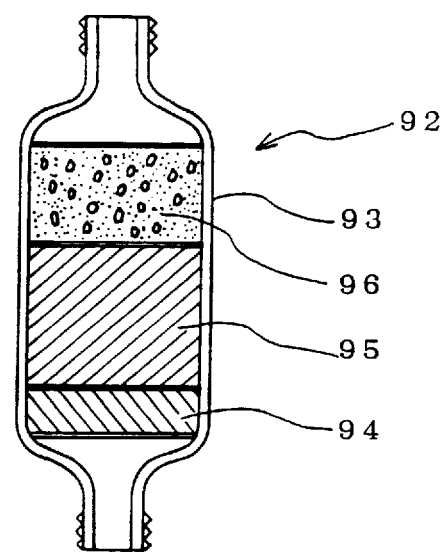

Referring now to FIG. 4, there will be described an another example of hand-held shower head. A hand-held shower head 9 as shown in FIG. 4 has generally the same structure as that of the shower head shown in FIG. 3, in which it has a shower grip 91 connected serially with a treatment unit 92 having therein with a hot-water treatment mechanism. The treatment unit 92 has a cylindrical unit case 93 in which an active carbon fiber layer 94, a calcium sulfite layer 95 and a coral sand layer 96 are placed in this order along a flow direction of hot water.

It is noted that where calcium sulfite, especially granular calcium sulfite is used alone, dissolving and solidifying actions of the calcium sulfite occur repeatedly to thereby increase in pressure loss of hot water running through the calcium sulfite. In contrast, according to the present example, only a small amount of calcium sulfite is used for the purpose of reducing the amount of active carbon fiber and coral sand to be used, and therefore the above defects caused by using a large amount of calcium sulfite can be avoided. In other words, since the amount of active carbon fiber and coral sand to be used can be reduced with using a small amount of calcium sulfite, a small and compact water purifying device can be realized. At the same time, the chlorine removing capacity can also be improved by cooperation of these three water purifying agents.

The order of the respective layers along the water-flow direction is not limited to the present example but can be layered in accordance with applications. Even when the order of the layer is changed, similar water purifying effect and the like can generally be obtained.

For example, where the calcium sulfite layer, coral sand layer and active carbon fiber layer are arranged in this order along the hot-water flow direction, hot water passing through the respective layers is treated as follows: First, the hot water is removed chlorine therefrom during passing through the calcium sulfite layer. Then, it passes through the coral sand layer, during which pH of the hot water is adjusted by minerals eluted from the coral sand. Finally, passing through the active carbon fiber layer, the hot water is subjected again to the chlorine removing treatment, and at the same time, is removed a trace amount of suspended matter, organic substances and odor therefrom.

It is noted that the respective layers are partitioned, for example, by water-permeable nonwoven sheets. According to the thus constituted hand-held shower head, the same effects as those of the aforementioned shower heads can also be obtained.

We claim:

1. A shower head having a hot-water treating mechanism characterized in that it comprises said hot-water treating mechanism placed in a water passage in said shower head, wherein said hot-water treating mechanism is provided with coral sand, active carbon fiber and calcium sulfite, said active carbon fiber, said calcium sulfite and said coral sand being arranged along a water-flow direction in said shower head, wherein said calcium sulfite in combination with said coral sand and said active carbon fiber requires a lesser overall volume thereof to obtain a predetermined water treatment capacity than a volume of only said active carbon fiber and said coral sand required to obtain the same said predetermined water treatment capacity.

2. A shower head having a hot-water treating mechanism according to claim 1, wherein said coral sand and said active carbon fiber are arranged serially along a water-flow direction in said shower head.

3. A shower head having a hot-water treating mechanism according to claim 2, wherein said hot-water treating mechanism comprises a core layer and an outer layer arranged concentrically around said core layer, and wherein said core layer comprises either one of said coral sand or said active carbon fiber and said outer layer comprises the other one of said coral sand and said active carbon fiber.

4. A shower head having a hot-water treating mechanism according to claim 1, wherein said hot-water treating mechanism comprises a first sheet having said coral sand and a second sheet made of said active carbon fiber, and wherein said first and second sheet are wound up in a condition that they are overlaid with each other.

5. A shower head having a hot-water treating mechanism according to claim 1, wherein said active carbon fiber is acrylic active carbon fiber.

6. A shower head having a hot-water treating mechanism according to claim 1, wherein said hot-water treating mechanism further comprises calcium sulfite.

7. A shower head having a hot-water treating mechanism according to claim 6, wherein said coral sand, said active carbon fiber and said calcium sulfite are arranged serially along a water-flow direction in said shower head.

8. A shower head having a hot-water treating mechanism according to claim 7, wherein said hot-water treating mechanism comprises a core layer, a middle layer formed concentrically around the core layer and an outer layer formed concentrically around the middle layer, and wherein said respective layers are formed with one of the above three materials, respectively and exclusively.

9. A shower head having a hot-water treating mechanism according to claim 6, wherein said hot-water treating mechanism comprises a first sheet having said coral sand, a second sheet made of said active carbon fiber and a third sheet having calcium sulfite, and wherein said first, second and third sheets are wound in a condition that these three sheets are overlaid.

10. A shower head having a hot-water treating mechanism according to claim 6, wherein said active carbon fiber is acrylic active carbon fibers.

11. A shower head having a hot-water treating mechanism according to claim 1, wherein said shower head comprises a hand-held shower head and said hot-water treating mechanism is disposed within said hand-held shower head.

12. A shower head having a hot-water treating mechanism according to claim 1, wherein said hot-water treating mechanism further comprises a porous core, a pore diameter of said porous core being dimensioned to substantially prevent coral sand from passing therethrough.

13. A shower head having a hot-water treating mechanism according to claim 1, wherein said active carbon fiber has a bulk density of approximately 0.05 to 0.2 g/cc.

14. A shower head having a hot-water treating mechanism according to claim 1, wherein said active carbon fiber comprises a layer having a thickness of approximately 15 mm to 20 mm.

15. A shower head having a hot-water treating mechanism according to claim 1, wherein minerals eluted from said coral combine with water passing therethrough to obtain a mineralized water.

16. A shower head having a hot-water treating mechanism according to claim 15, wherein said coral sand, active carbon fiber and calcium sulfite are serially arranged along the water-flow direction.

17. A shower head having a hot-water treating mechanism according to claim 1, wherein said coral sand, active carbon fiber and calcium sulfite are serially arranged along the water-flow direction.

* * * * *